9638X
S. Ladd.
Spinning Flyer.
Patented May 6, 1836.
No. 1.
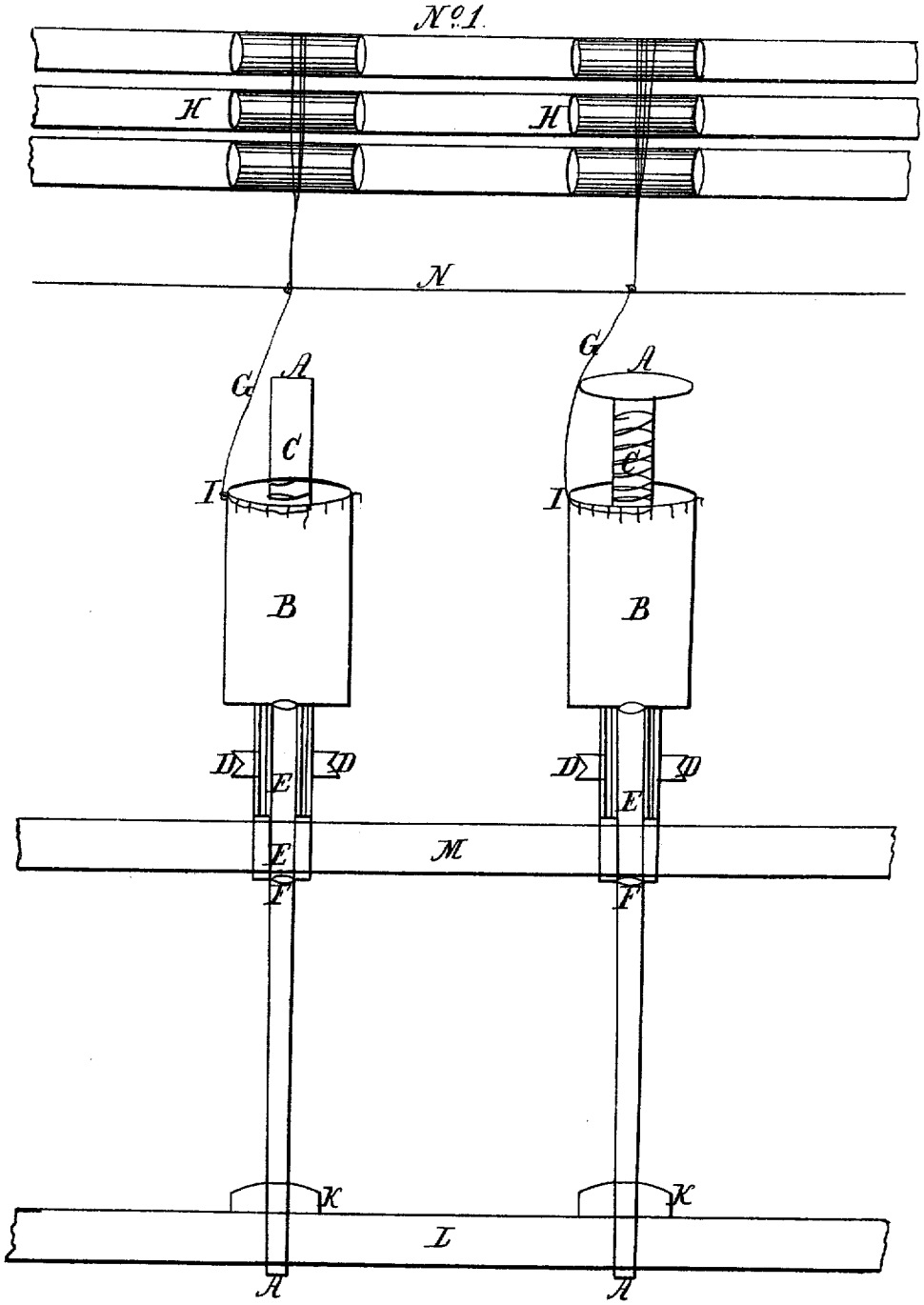
N. PETERS, PHOTO-LITHOGRAPHER, WASHINGTON, D. C.

May 6. 1836
9638X

Samuel Ladd of Waltham, Massachusetts
Letters Patent

The schedule referred to in these Letters Patent and making
part of the same containing a description in the words of the
said Samuel Ladd himself of his improvement in the Hollow
cylinder Flyer for manufacturing roving, yarn and thread
To all to whom these presents shall come,
Be it known that I Samuel Ladd of Waltham in the County
of Middlesex and State of Massachusetts have invented a
new and useful improvement in the method of manufacturing
roving yarn and thread by the use of the hollow cylindrical
flyer which has not been heretofore known or used and that
the following is a full and exact description thereof.
The drawing herein annexed numbered 1. represents the
machinery used for manufacturing roving yarn and thread
the part of the drawing No A. A. represents a perpendicular
spindle around which the hollow cylindrical Flyer revolves
B. the flyer D. D. the whirl, to receive the band, or belt which
causes the flyer to revolve E, the part contiguous to the tube
called the bushing with which the flyer revolves F. a cylindrical
tube, on which the bushing rests likewise the bushing revolves
around the tube which passes up inside of the bushing G. represents the
roving yarn or thread passing down through the rollers H. H.
and the guide N. N. and also the guide or hook I. on the
top of the flyer and around the top sufficient to give the requi-
-red draft on to the spool C, M. M. represents a stationary
rail in which the tube is fixed. L. L. a moveable rail to
let rise and fall the spool C, & K a weight to keep the
spindle in its place. What I claim as my own invention
and not previously known in the above mentioned machine are the [illegible]

74. 9638X

B. and C. (the flyer and bushing) Styles Ladd's Patent hollow cylindrical flyer, and can be made of wood or metallic substance, likewise the application of the tube on which the bushing sits and around which said bushing revolves.

Witnesses
Samuel Ladd
Lewis Moore
Samuel Perry

Ex. Mfl.

Drawing